(12) United States Patent
Uematsu

(10) Patent No.: US 10,361,610 B2
(45) Date of Patent: Jul. 23, 2019

(54) ENCODER CAPABLE OF ERASING MEMORY INFORMATION AND MOTOR SYSTEM INCLUDING THE SAME

(71) Applicant: FANUC CORPORATION, Yamanashi (JP)

(72) Inventor: Hidetoshi Uematsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 145 days.

(21) Appl. No.: 15/664,340

(22) Filed: Jul. 31, 2017

(65) Prior Publication Data

US 2018/0041099 A1   Feb. 8, 2018

(30) Foreign Application Priority Data

Aug. 2, 2016   (JP) ................. 2016-151990

(51) Int. Cl.
| | |
|---|---|
| *G01D 5/12* | (2006.01) |
| *H02K 11/35* | (2016.01) |
| *H02K 11/21* | (2016.01) |
| *H02K 11/25* | (2016.01) |
| *H02K 5/22* | (2006.01) |
| *G01D 5/245* | (2006.01) |
| *H02P 6/16* | (2016.01) |

(52) U.S. Cl.
CPC ............ *H02K 11/35* (2016.01); *G01D 5/12* (2013.01); *G01D 5/245* (2013.01); *H02K 5/225* (2013.01); *H02K 11/21* (2016.01); *H02K 11/25* (2016.01)

(58) Field of Classification Search
CPC .......... H02K 5/22; H02K 11/00; H02K 11/21; H02K 11/25; H02K 11/35; H02P 6/16; G01D 5/12; G01D 5/245
See application file for complete search history.

(56) References Cited

U.S. PATENT DOCUMENTS

| | | | | |
|---|---|---|---|---|
| 4,937,945 | A * | 7/1990 | Schofield | G01C 17/26 33/356 |
| 6,243,023 | B1 * | 6/2001 | Katagiri | G01D 3/022 318/661 |
| 6,350,984 | B1 * | 2/2002 | Senda | G01D 5/34707 250/231.13 |
| 7,535,342 | B2 | 5/2009 | Tanaka et al. | |
| 2006/0192517 | A1 * | 8/2006 | Miyashita | H02P 6/17 318/652 |
| 2016/0252375 | A1 * | 9/2016 | Kikuchi | G01D 5/24495 702/94 |

FOREIGN PATENT DOCUMENTS

| | | |
|---|---|---|
| JP | 11-161336 A | 6/1999 |
| JP | H11178385 A | 7/1999 |

(Continued)

*Primary Examiner* — Bentsu Ro
(74) *Attorney, Agent, or Firm* — RatnerPrestia

(57) ABSTRACT

An encoder which detects information on the position or the speed of a motor includes memory which stores motor-specific information on the motor to be mounted on the encoder, a mount determination unit which determines whether the encoder has been removed from the motor, and a memory information erasure unit which erases the motor-specific information stored in the memory when the mount determination unit determines that the encoder has been removed from the motor.

3 Claims, 2 Drawing Sheets

(56) References Cited

FOREIGN PATENT DOCUMENTS

| | | | |
|---|---|---|---|
| JP | H11304534 | A | 11/1999 |
| JP | 2001028893 | A | 1/2001 |
| JP | 2003327072 | A | 11/2003 |
| JP | 2004-72902 | A | 3/2004 |
| JP | 2004237814 | A | 8/2004 |
| JP | 2006092126 | A | 4/2006 |
| JP | 2012134209 | A | 7/2012 |
| JP | 2013101686 | A | 5/2013 |
| JP | 2013109605 | A | 6/2013 |
| JP | 2015148482 | A | 8/2015 |
| WO | 2012176911 | A1 | 12/2012 |

* cited by examiner

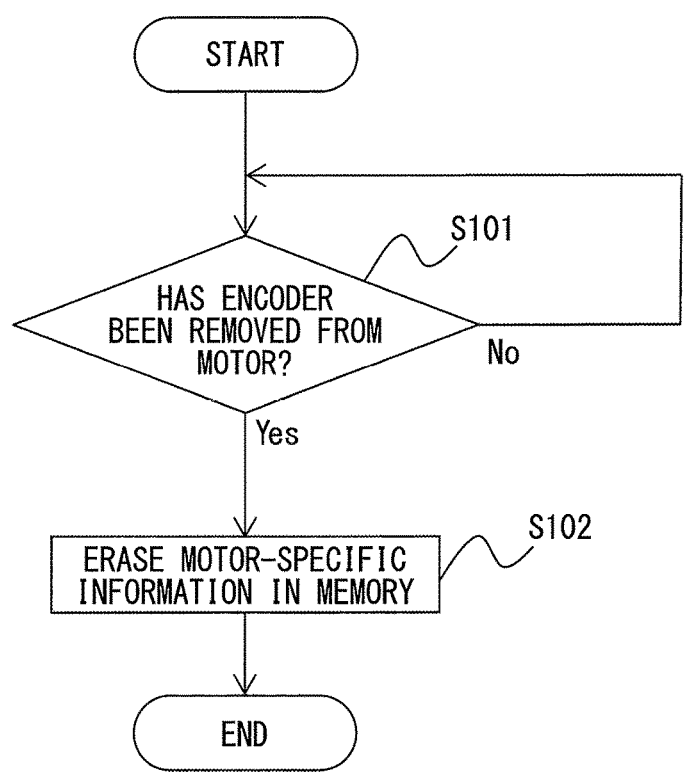

ENCODER CAPABLE OF ERASING MEMORY INFORMATION AND MOTOR SYSTEM INCLUDING THE SAME

BACKGROUND OF THE INVENTION

1. Field of the Invention

The present invention relates to an encoder which detects information on the position or the speed of a motor and a motor system including the same.

2. Description of the Related Art

In recent years, it has been performed to store, in memory provided in an encoder which detects information on the position or the speed of a motor, motor-specific information on the motor, which is used to manage the motor. More specifically, the type or the serial number of the motor is stored in the memory within the encoder and used for maintenance work such as the repair of the motor, the call number of a motor control parameter is stored to enable automatic setting of the parameter on a plug-and-play basis, or motor-specific information such as the constant of back electromotive force, the inductance, the resistance, or the angle of mounting deviation of the motor is stored to improve the efficiency and stability of motor control.

As disclosed in, e.g., Japanese Unexamined Patent Publication (Kokai) No. 2004-72902, a technique is available in which, in a magnetic pole position adjustment device for an AC synchronous motor used in work for mounting an encoder on the AC synchronous motor, the angle of deviation between the origin position of the magnetic pole of the AC synchronous motor and the origin of the encoder in assembly and mounting is calculated and stored in a memory device within the encoder to perform adjustment by software correction of the angle of deviation.

As disclosed in, e.g., Japanese Unexamined Patent Publication (Kokai) No. H11-161336, a technique is available for improving the maintainability in encoder replacement by writing motor-related data stored in memory within an encoder before replacement into memory within a new replacement encoder.

When an encoder storing motor-specific information in its memory is removed from a motor corresponding to the motor-specific information and mounted on another motor, the motor-specific information on the old motor before removal remains in the memory of the encoder, but this information is incorrect and useless in any way to the new replacement motor. For example, since motor individual information, such as the constant of back electromotive force, the inductance, the resistance, or the angle of mounting deviation of the old motor before removal, remaining in the memory of the encoder do not match the replacement motor, even when the encoder still storing the motor-specific information on the old motor before removal is used to detect the position or the speed of the new replacement motor, the detection result obtained by the encoder contains an error, so that the motor may malfunction or become uncontrollable upon control of the motor based on the detection result obtained by the encoder. In addition, the call number of the old motor control parameter and the type and the serial number of the old motor before removal are naturally meaningless for the replacement motor.

SUMMARY OF INVENTION

It has been desired to provide an encoder and a motor system including the same, in which motor-specific information on a motor before replacement stored in the encoder is not used in a new motor on which the encoder is mounted.

In one aspect of the present disclosure, an encoder which detects information on one of a position and a speed of a motor includes memory which stores motor-specific information on the motor to be mounted on the encoder, a mount determination unit which determines whether the encoder has been removed from the motor, and a memory information erasure unit which erases the motor-specific information stored in the memory when the mount determination unit determines that the encoder has been removed from the motor.

Herein, the mount determination unit may include a connection detection connector which is connected to conducting wires led from a temperature sensor provided in the motor when the encoder is mounted on the motor, and is released from connection to the conducting wires when the encoder is removed from the motor, and a determination processing unit which determines whether connection between the connection detection connector and the conducting wires has been released, and wherein the determination processing unit determines that the encoder has been removed from the motor when it is determined that the connection between the connection detection connector and the conducting wires has been released.

Further, according to one aspect of the present disclosure, a motor system includes a motor and the encoder that detects information on one of a position and a speed of the motor, wherein the motor includes a temperature sensor which detects a temperature of the motor and a motor connector configured to connect conducting wires led from the temperature sensor to the connection detection connector provided in the encoder.

BRIEF DESCRIPTION OF THE DRAWINGS

The present invention will be more clearly understood with reference to the following accompanying drawings:

FIG. 2 is a flowchart illustrating the operation sequence of processing for erasing motor-specific information stored in memory for an encoder 1 and a motor system 100 including the same according to the embodiment of the present disclosure.

DETAILED DESCRIPTION

Figure 1A:
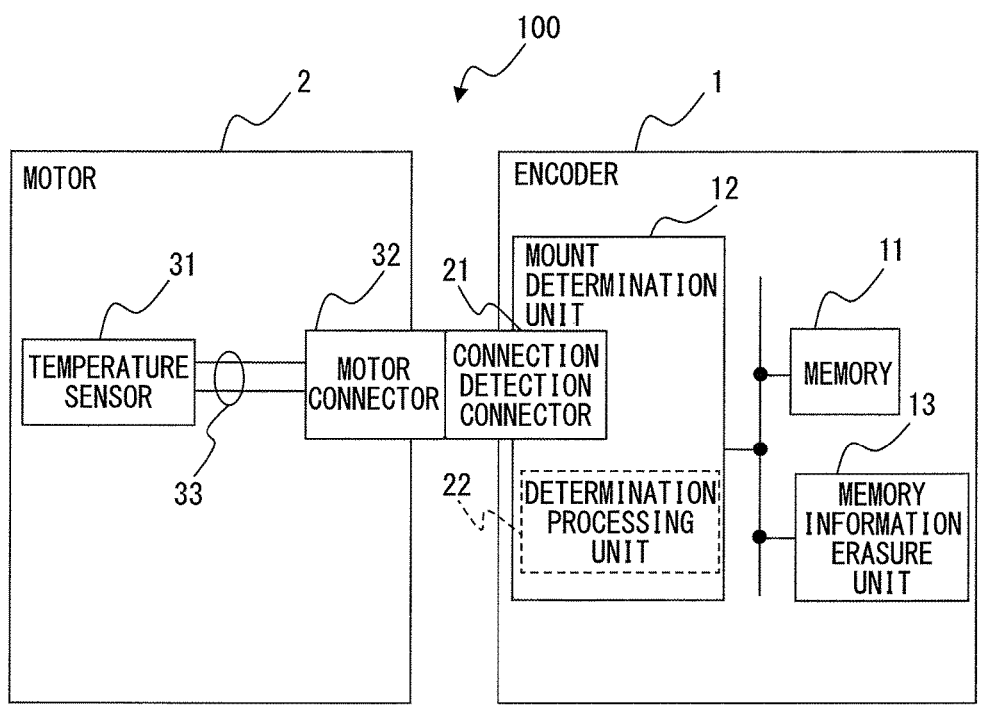
FIG. 1A is a block diagram illustrating an encoder mounted on a motor.

An embodiment of the present disclosure will be described below with reference to the drawings. In the following drawings, the same reference numerals denote the same members. To facilitate understanding, these drawings use different scales as appropriate. Further, the modes illustrated in the drawings are merely examples for carrying out one aspect of the present disclosure, which is not limited to the modes illustrated in the drawings.

Figure 1B:
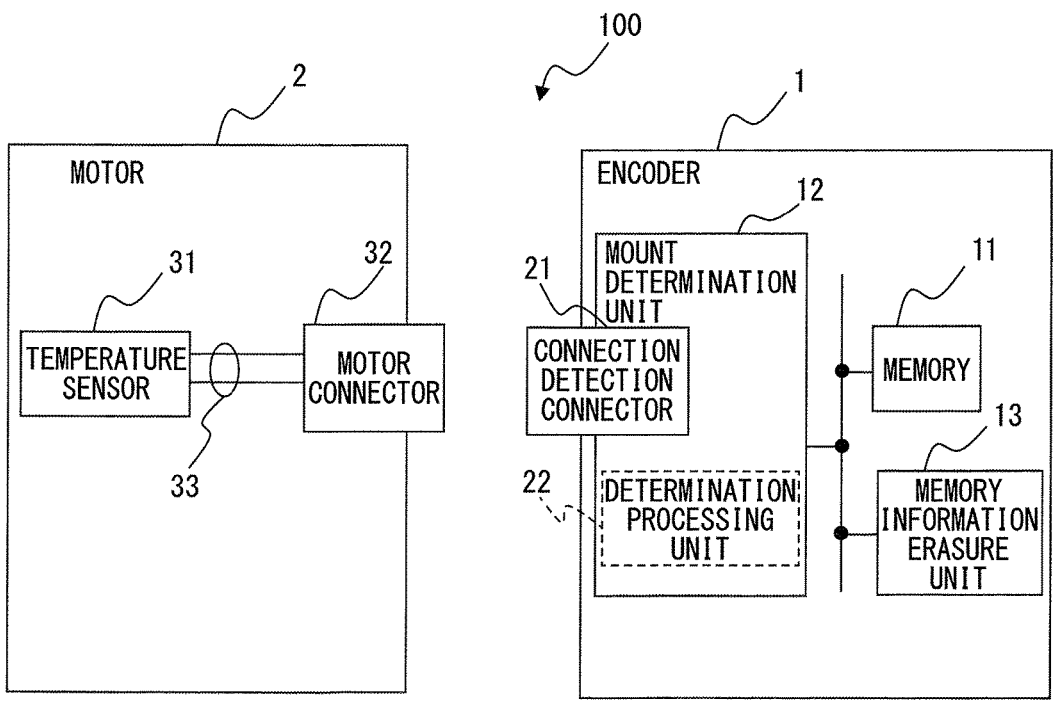
FIG. 1B is a block diagram illustrating an encoder removed from the motor.

FIG. 1A is a block diagram illustrating an encoder according to an embodiment of the present disclosure, where the encoder is mounted on a motor. FIG. 1B is a block diagram illustrating an encoder, where the encoder is removed from the motor.

A motor system 100 includes an encoder 1 and a motor 2. The motor 2 includes a temperature sensor 31 which detects the temperature of the motor 2, and a motor connector 32 for connecting conducting wires 33 led from the temperature sensor 31 to a connection detection connector 21 provided in the encoder 1. Two signal lines, including a ground line, are led from the temperature sensor 31 and connected to a motor controller (not illustrated), and an electrical signal associated with temperature information detected by the temperature sensor 31 is sent to the motor controller (not illustrated) via the signal lines from the temperature sensor 31. The conducting wires 33 are led upon branching from the signal lines from the temperature sensor 31. In the present embodiment, it is determined whether the encoder 1 has been removed from the motor 2, on the basis of whether connection between the connection detection connector 21 in the encoder 1 and the conducting wires 33 led from the temperature sensor 31 in the motor 2 has been released, although details will be described later.

The encoder 1 that detects information on the position or the speed of the motor 2 includes memory 11, a mount determination unit 12, and a memory information erasure unit 13. The mount determination unit 12 includes the connection detection connector 21 and a determination processing unit 22. In the encoder 1, the configuration of an arithmetic processing unit (not illustrated) which detects information on the position or the speed of the motor 2 itself does not limit the present embodiment, and may be implemented as a known configuration using, e.g., a CPU or an ASIC (Application-Specific IC). When, for example, the encoder 1 is used to detect the position of a rotor (not illustrated) of the motor 2 serving as an object to be detected, information related to the position and the direction of rotation of the rotor is detected on the basis of sinusoidal waves of two phases (phases a and b) that are 90° out of phase with each other corresponding to the position of the rotor of the motor 2 sensed by a sensing unit (not illustrated) of the encoder 1.

The memory 11 is used to store motor-specific information on the motor 2 to be mounted on the encoder 1 and is implemented as nonvolatile memory such as EPROM or EEPROM capable of erasing storage contents. Examples of the motor-specific information may include information for specifying the motor 2, such as the type, the specifications, the version number, the lot number, and the serial number of the motor 2, the call number of a motor control parameter, the constant of back electromotive force, the inductance, and the resistance of the motor 2, and the angle of mounting deviation of the encoder 1 with respect to the motor 2. Information other than these types of information may further be stored in the memory 11 as motor-specific information. The method for writing motor-specific information into the memory 11 itself does not limit the present embodiment, and a method is available for, e.g., writing motor-specific information into the memory 11 by connecting a computer (not illustrated) to the encoder 1 and operating an input device such as a keyboard, a mouse, or a touch panel by an operator.

The mount determination unit 12 includes the connection detection connector 21 and the determination processing unit 22 and determines whether the encoder 1 has been removed from the motor 2. More particularly, the determination processing unit 22 determines whether connection between the connection detection connector 21 and the conducting wires 33 has been released and determines that the encoder 1 has been removed from the motor 2 when it determines that connection between the connection detection connector 21 and the conducting wires 33 has been released.

The connection detection connector 21 in the mount determination unit 12 has a structure which is connected via the motor connector 32 to the conducting wires 33 led from the temperature sensor 31 provided in the motor 2 when the encoder 1 is mounted on the motor 2, and releases connection to the conducting wires 33 via the motor connector 32 when the encoder 1 is removed from the motor 2. The connection detection connector 21 includes a mechanical mechanism (not illustrated) attachable and detachable to and from the motor connector 32, and signal terminals (not illustrated) which come into electrical contact with the signal terminals of the motor connector 32 in connection to the motor connector 32. The arrangements and the shapes of the mechanical mechanism and the signal terminals in the connection detection connector 21 do not particularly limit the present embodiment.

The determination processing unit 22 in the mount determination unit 12 determines that the encoder 1 has been removed from the motor 2 when connection between the connection detection connector 21 and the conducting wires 33 in the motor 2 has been released. A more detailed description will be given hereinafter. An electrical signal associated with temperature information detected by the temperature sensor 31 is sent to the motor controller (not illustrated) via the signal lines from the temperature sensor 31, as described above. As illustrated in FIG. 1A, while the encoder 1 is kept mounted on the motor 2, the motor connector 32 and the connection detection connector 21 are electrically connected to each other across respective signal terminals, and the determination processing unit 22 in the mount determination unit 12 therefore receives the above-mentioned electrical signal. As illustrated in FIG. 1B, when the encoder 1 is removed from the motor 2, connection between the motor connector 32 and the connection detection connector 21 is released, and the determination processing unit 22 in the mount determination unit 12 therefore does not receive the above-mentioned electrical signal. In the present embodiment, the determination processing unit 22 in the mount determination unit 12 monitors whether the above-mentioned electrical signal is received, and determines that the encoder 1 has been mounted on the motor 2 when the above-mentioned electrical signal is received and determines that the encoder 1 has been removed from the motor 2 when the above-mentioned electrical signal is not received.

The memory information erasure unit 13 accesses the memory 11 and erases the motor-specific information stored in the memory 11 when the mount determination unit 12 determines that the encoder 1 has been removed from the motor 2.

In the encoder 1, the memory 11, the mount determination unit 12, and the memory information erasure unit 13 are electrically connected to each other via buses.

The determination processing unit 22 and the memory information erasure unit 13 may be provided in an arithmetic processing unit (not illustrated) which detects information on the position or the speed of the motor 2 in the encoder 1. The determination processing unit 22 and the memory information erasure unit 13 may be constructed in the form of, e.g., a software program, and in this case, the functions of the above-mentioned respective units can be implemented by operating an arithmetic processing unit (not illustrated) which detects information on the position or the speed of the motor 2 in the encoder 1, in accordance with the software program. Alternatively, the determination processing unit 22 and the memory information erasure unit 13 may be constructed in a combination of various electronic circuits and software programs. Or again, the determination processing unit 22 and the memory information erasure unit 13 may be implemented as a semiconductor integrated circuit into which a software program for implementing the function of each unit is written. The determination processing unit 22 and the memory information erasure unit 13 may even be implemented by respectively assigning separate arithmetic processing units (CPUs or ASICs) to them.

Processing for erasing the motor-specific information stored in the memory 11 for the encoder 1 and the motor system 100 including the same according to the present embodiment will be described below. FIG. 2 is a flowchart illustrating the operation sequence of processing for erasing motor-specific information stored in memory for the encoder 1 and the motor system 100 including the same according to the embodiment of the present disclosure.

In the initial state, the encoder 1 is mounted on the motor 2, and motor-specific information on the motor 2 is stored in the memory 11 within the encoder 1.

In step S101, the mount determination unit 12 determines whether the encoder 1 has been removed from the motor 2. More specifically, the determination processing unit 22 in the mount determination unit 12 determines whether connection between the connection detection connector 21 and the conducting wires 33 has been released. When the determination processing unit 22 in the mount determination unit 12 determines in step S101 that connection between the connection detection connector 21 and the conducting wires 33 has been released, it determines that the encoder 1 has been removed from the motor 2 and advances to step S102.

In step S102, the memory information erasure unit 13 accesses the memory 11 and erases the motor-specific information stored in the memory 11. Upon motor-specific information erasure, even when the removed encoder 1 is mounted on a new motor different from the motor 2 mounted previously and is used to detect information on the position or the speed of the new motor, the motor-specific information on the motor 2 mounted previously has no adverse effect. The encoder 1 after motor-specific information erasure may then be connected to a computer (not illustrated) and an operator may operate an input device such as a keyboard, a mouse, or a touch panel to write motor-specific information on the new motor into the memory 11 of the encoder 1, thus facilitating management of the new motor, as in the previous motor 2.

According to one aspect of the present disclosure, an encoder and a motor system including the same can be implemented, in which motor-specific information on a motor before replacement stored in the encoder is not used in a new motor on which the encoder is mounted. Motor-specific information stored in memory within the encoder is used for maintenance work such as the repair of the motor, to enable automatic setting of a parameter on a plug-and-play basis, or to improve the efficiency and stability of motor control, and according to one aspect of the present disclosure, since the motor-specific information is erased from the memory in the encoder when the encoder is removed from the motor, even when the removed encoder is mounted on a new replacement motor, the motor-specific information on the motor before removal is not used, so that adverse effects such as a detection error of the encoder and a malfunction of the motor, resulting from such use to detect the position or the speed of the new motor, can be prevented.

What is claimed is:

1. An encoder which detects information on one of a position and a speed of a motor, the encoder comprising:
   memory which stores motor-specific information on the motor to be attached to the encoder;
   a mount determination unit which determines whether the encoder has been removed from the motor; and
   a memory information erasure unit which erases the motor-specific information stored in the memory when the mount determination unit determines that the encoder has been removed from the motor.

2. The encoder according to claim 1, wherein
   the mount determination unit comprises:
   a connection detection connector which is connected to conducting wires led from a temperature sensor provided in the motor when the encoder is mounted on the motor, and is released from connection to the conducting wires when the encoder is removed from the motor; and
   a determination processing unit which determines whether connection between the connection detection connector and the conducting wires has been released, and
   the determination processing unit determines that the encoder has been removed from the motor when it is determined that the connection between the connection detection connector and the conducting wires has been released.

3. A motor system comprising a motor and the encoder, according to claim 2, that detects information on one of a position and a speed of the motor,
   the motor comprising:
   a temperature sensor which detects a temperature of the motor; and
   a motor connector configured to connect conducting wires led from the temperature sensor to the connection detection connector provided in the encoder.

* * * * *